United States Patent [19]

Rasmusen

[11] Patent Number: 4,749,527

[45] Date of Patent: Jun. 7, 1988

[54] STATIC AERATOR

[76] Inventor: Hans C. Rasmusen, 555-4678B Elk Lake Drive, Victoria, B.C., Canada, V8Z 5M1

[21] Appl. No.: 904,659

[22] Filed: Sep. 5, 1986

[30] Foreign Application Priority Data

Sep. 6, 1985 [CA] Canada .................... 490496

[51] Int. Cl.$^4$ .............................................. B01F 3/04
[52] U.S. Cl. ...................... 261/76; 261/123; 261/79.2; 366/339
[58] Field of Search ............... 366/339, 338; 261/79.1, 261/79.2, 123, 76; 55/238

[56] References Cited

U.S. PATENT DOCUMENTS

| | | |
|---|---|---|
| 808,752 | 1/1906 | Isaacs . |
| 963,832 | 7/1910 | Tiemann ................... 55/238 |
| 1,038,262 | 9/1912 | Anstice ................... 261/79.1 |
| 1,494,675 | 5/1924 | Ehrhart ................... 261/79.2 |
| 1,782,602 | 11/1930 | Brush ................... 123/590 |
| 1,959,907 | 5/1934 | Ebert ................... 261/79.1 |
| 2,384,681 | 9/1945 | James ................... 123/590 |
| 2,816,518 | 12/1957 | Daggett . |
| 3,452,966 | 7/1969 | Smolski ................... 261/123 |
| 3,620,507 | 11/1971 | Kruka . |
| 3,664,638 | 5/1972 | Grout et al. ................... 366/338 |
| 3,862,022 | 1/1975 | Hermann . |
| 3,974,939 | 4/1976 | Steiner . |
| 4,068,830 | 1/1978 | Gray . |
| 4,183,682 | 1/1980 | Lieffers . |
| 4,202,635 | 5/1980 | Hendrickson . |
| 4,224,158 | 9/1980 | Molvar . |
| 4,259,024 | 3/1981 | Clasen et al. . |
| 4,408,890 | 10/1983 | Beckmann . |
| 4,466,741 | 8/1984 | Kojima . |
| 4,532,038 | 7/1985 | Reid ................... 261/123 |

FOREIGN PATENT DOCUMENTS 2731301 1/1978 Fed. Rep. of Germany ..... 261/79.2

Primary Examiner—Tim Miles
Attorney, Agent, or Firm—Spensley Horn Jubas & Lubitz

[57] ABSTRACT

An improved motionless mixer, referred to herein as a static aerator, for dissolving gases in liquids is disclosed. The static aerator incorporates a helical mixing element in which the pitch of the blade or vane of the helical mixing element decreases continuously along the length of the mixing element. The linear velocity of the flowing liquid is thereby subjected to increasing angular acceleration resulting in centrifugal force against the retaining walls. This additional pressure generated on the liquid increases the amount of gas that may be dissolved in the liquid.

6 Claims, 4 Drawing Sheets

STATIC AERATOR

BACKGROUND OF THE INVENTION

1. Field of the Invention

The invention relates to the field of motionless mixers and more particularly to the application of motionless mixers to the mixing of gas in a liquid, such as the oxygenation of waste water in waste water treatment systems.

2. Description of the Prior Art

Motionless mixers generally consist of a helical blade or vane which is fixed in a pipe or tube through which a liquid flows in order to mix the components of the liquid. They are referred to as motionless mixers because they have no moving parts. As the fluid flows through the motionless mixer, it is divided into two streams which are rotated about the central axis of the pipe, resulting in a mixture of the fluid once it passes through the motionless mixer. For example, see U.S. Pat. No. 4,466,741 in the name of Kojima, entitled "Mixing Element and Motionless Mixer", issued Aug. 21, 1984 which describes the prior art in the field of motionless mixers. The mixing effect is partly achieved through an increase in the area of contact between the materials to be mixed.

In many applications it is necessary to dissolve gases in a stream of liquid. For example, in sewage treatment it is desirable to dissolve oxygen in a flow of waste water. Similarly, the pulp and paper process involves at one stage a dissolving of oxygen in a stream of liquid. The wine-making process also involves the dissolution of nitrogen in a stream of wine. Up to the present this method of dissolving gases in liquid has involved simply injecting gas into the stream of liquid, or pumping the gas through the liquid, thereby dissolving the gas at atmospheric pressure. The rate of dissolution of gas in the liquid is lower than would be the case if the liquid were under a higher pressure.

Motionless mixers have been used in the mixing of gases and liquid, such as the oxygenation of water. Motionless mixers have also been used in waste water treatment systems, both to mix solid or liquid additives, to assist in the flocculation process, and to dissolve gases such as oxygen in the water. The problem in such applications has been to maximize the oxygen transfer and absorption efficiency in the waste water. Compressed oxygen is an expensive commodity. Even with the addition of a standard motionless mixer, much of the oxygen remains in the gaseous state as bubbles in the liquid and is eventually lost to the air, rather than being dissolved in the water to increase the beneficial activity of bacteria.

SUMMARY OF THE INVENTION

The present invention provides a motionless mixer with improved gas-to-liquid transfer and absorption efficiency. The motionless mixer of the invention comprises a helical blade whose pitch, defined as the distance between corresponding points on two adjacent threads of the helix, decreases continuously from one end of the helix to the other. Preferably, the blade of the helix travels through a complete rotation of about 360°. The motionless mixer of the invention is particularly adapted for use in a waste water treatment system wherein oxygen is injected under pressure into the flow of waste water prior to the passage of the waste water through the motionless mixer.

The present invention utilizes the pressure created by the centrifugal force to increase the rate of dissolution of gas in the liquid. The helical blade or vane causes a rotational acceleration in the liquid which in turns causes a centrifugal force to be applied by the liquid against the sides of the pipe. This additional pressure generated in the liquid increases the amount of gas dissolved in the liquid. The pitch of the helical mixing element in the present invention is not constant but in fact decreases along the length of the spiral so that the spiral becomes tighter the farther the liquid moves along the spiral. The rate of acceleration of the liquid is thereby increased as the liquid moves along the spiral. In existing motionless mixers, the rotational acceleration is imparted at a constant rate.

In the present invention, gas is injected under pressure into the liquid as it enters the static aerator. The pressure of contact between the gaseous bubbles and the liquid along the length of the mixer will be increased due to the increased centrifugal force acting on the liquid against the sides of the pipe. This is well known, that the greater the pressure applied to the liquid the greater will be the absorption of gas. It has been found experimentally that the increased efficency of the oxygen absorption rate is much greater than would be expected from a mere increase in the angular velocity of the fluid.

BRIEF DESCRIPTION OF THE DRAWINGS

In drawings which illustrate an embodiment of the invention.

DETAILED DESCRIPTION OF THE PREFERRED EMBODIMENT

Figure 1:
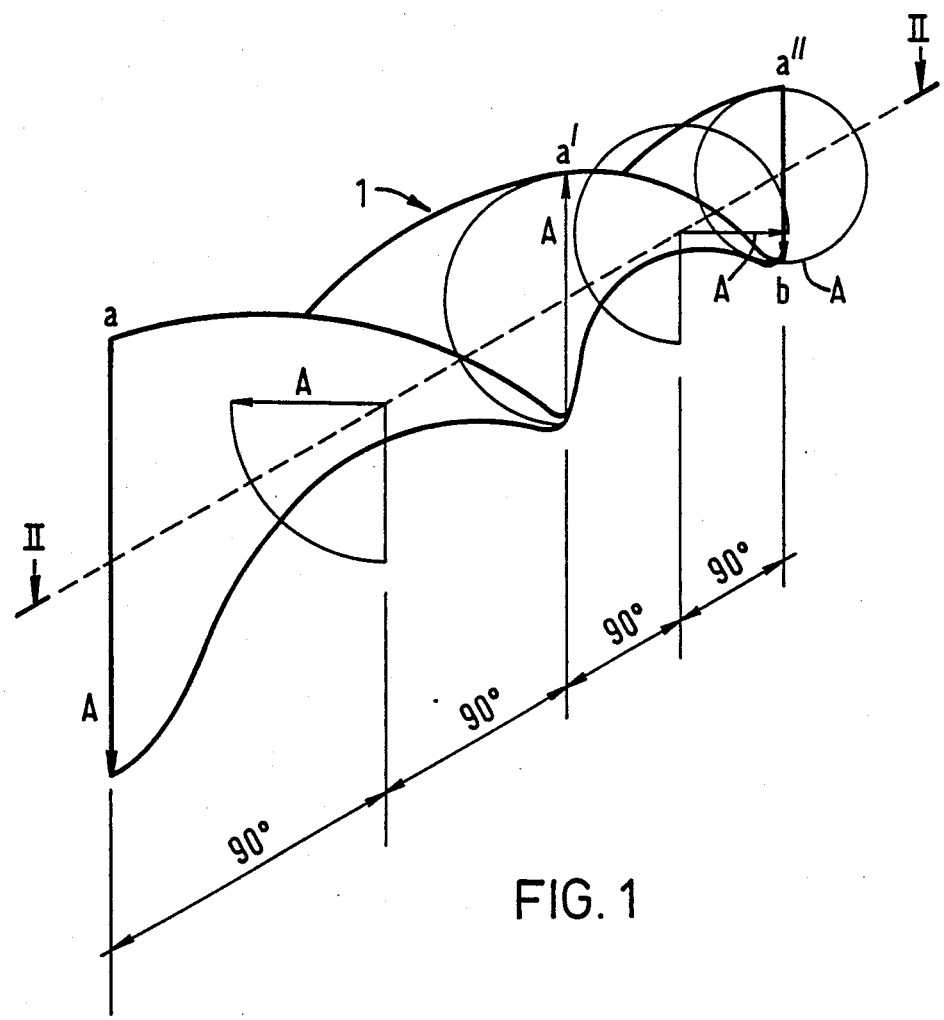
FIG. 1 is a perspective view of the helical blade of the motionless mixer of the invention.

The motionless mixer of the invention as shown in FIG. 1 comprises a helical blade designated as 1. The blade is twisted through an angle of approximately 360° or $2\pi$ radians. That is, a line A formed by the intersection of a vertical plane with the blade at any point goes through a rotation of 360° from point a to b in FIG. 1. The present motionless mixer differs from the prior art motionless mixers in that the pitch of the helix decreases from end a to end b. Defining pitch as the distance between corresponding points on adjacent threads of the helix, the distance a–a' is greater, as shown in FIG. 1, than the distance a'–a''.

In mathematical terms, the spiral path of point a along the edge of the helix from one end to the other in a standard helix would be $x = m \cos \phi$, $y = m \sin \phi$ and $z = n \phi$, where $\phi$ is a parameter which we will call the helix angle and m and n are constants. The helix angle may be seen to be the angle formed between the line A and the vertical in FIG. 1. Thus in a standard helix, the change in the z co-ordinate of point a with respect to the change in the helix angle is a constant $$\left(\frac{dz}{d\phi} = n\right)$$

while the second derivative of the z co-ordinate with respect to φ is 0

$$\left(\frac{d^2z}{d\phi^2} = 0\right).$$

In the present invention, however, there is a deceleration of the z co-ordinate with relation to the helix angle, or in mathematical terms $d^2z/d\phi^2$ is less than 0. (Or viewed alternatively, $d\phi/dz$ is non-constant and $d^2\phi/dz^2$ is greater than 0.)

Thus in the motionless mixer of the present invention, for example, the z co-ordinate of point a could vary inversely as the square of the helix angle φ. The desired results are achieved so long as there is a continuous decrease in pitch, or in other words so long as $d^2z/d\phi^2$ is less than zero.

Figure 4:
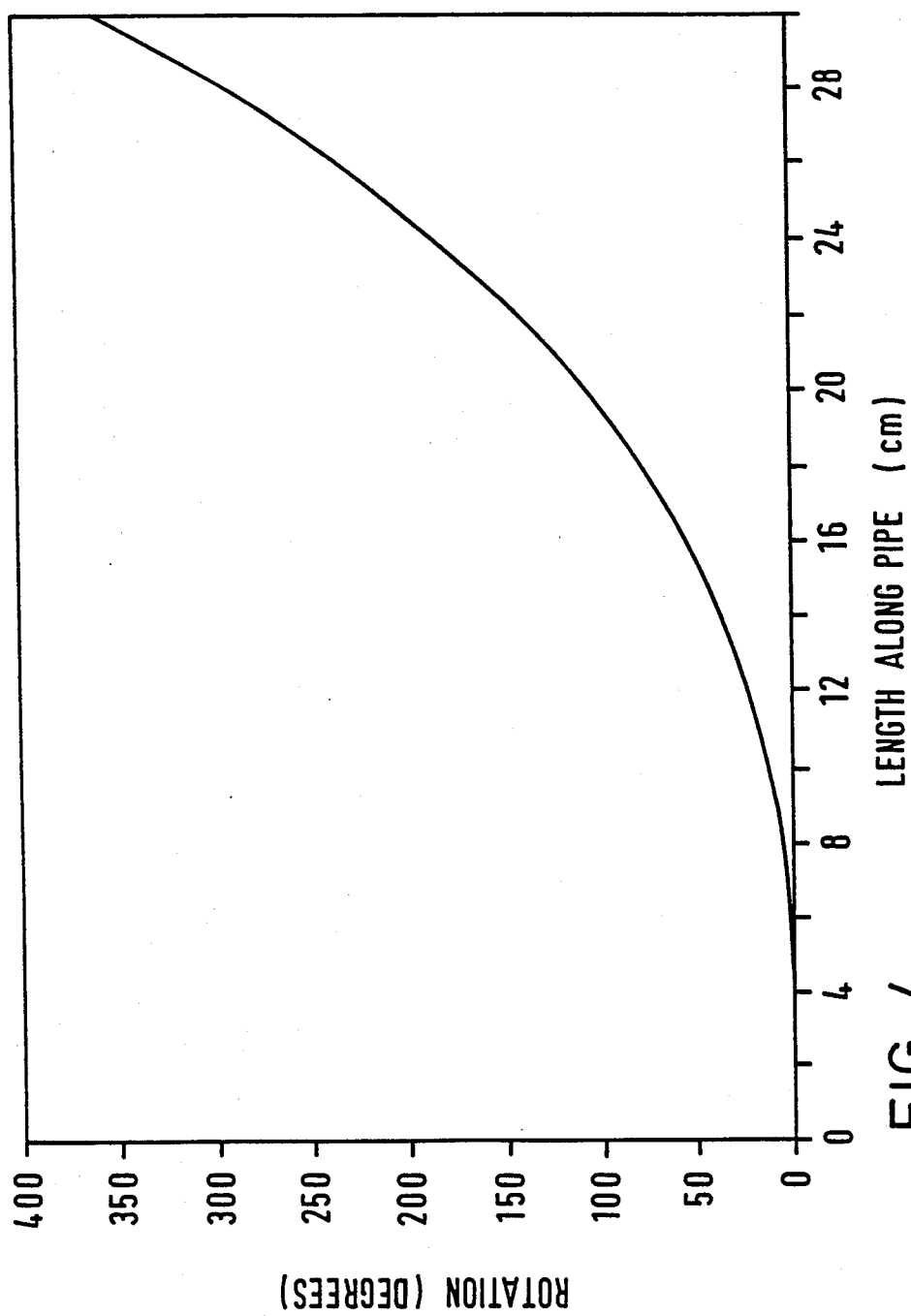

In a preferred embodiment, the helical angle varies proportionately to the third power of the z co-ordinate. (The helical angle φ is equal to a constant times the cube of the distance along the Z-coordinate, or $\phi = NZ^3$) The following Table 1 shows the relationship of the helical angle at any point on the helical element to the length travelled along the element. This relationship is further illustrated in the graph in FIG. 4.

TABLE 1

| Length Along Pipe (cm) | Rotation (degrees) |
| --- | --- |
| 0.0 | 0.0 |
| 0.5 | .0 |
| 1.0 | .0 |
| 1.5 | .0 |
| 2.0 | 0.1 |
| 2.5 | 0.2 |
| 3.0 | 0.4 |
| 3.5 | 0.6 |
| 4.0 | 0.9 |
| 4.5 | 1.2 |
| 5.0 | 1.7 |
| 5.5 | 2.2 |
| 6.0 | 2.9 |
| 6.5 | 3.7 |
| 7.0 | 4.6 |
| 7.5 | 5.6 |
| 8.0 | 6.8 |
| 8.5 | 8.2 |
| 9.0 | 9.7 |
| 9.5 | 11.4 |
| 10.0 | 13.3 |
| 10.5 | 15.4 |
| 11.0 | 17.7 |
| 11.5 | 20.3 |
| 12.0 | 23.0 |
| 12.5 | 26.0 |
| 13.0 | 29.3 |
| 13.5 | 32.8 |
| 14.0 | 36.6 |
| 14.5 | 40.6 |
| 15.0 | 45.0 |
| 15.5 | 49.7 |
| 16.0 | 54.6 |
| 16.5 | 59.9 |
| 17.0 | 65.5 |
| 17.5 | 71.5 |
| 18.0 | 77.8 |
| 18.5 | 84.4 |
| 19.0 | 91.5 |
| 19.5 | 98.9 |
| 20.0 | 106.7 |

TABLE 1-continued

| Length Along Pipe (cm) | Rotation (degrees) |
| --- | --- |
| 20.5 | 114.9 |
| 21.0 | 123.5 |
| 21.5 | 132.5 |
| 22.0 | 142.0 |
| 22.5 | 151.9 |
| 23.0 | 162.2 |
| 23.5 | 173.0 |
| 24.0 | 184.3 |
| 24.5 | 196.1 |
| 25.0 | 208.3 |
| 25.5 | 221.1 |
| 26.0 | 234.3 |
| 26.5 | 248.1 |
| 27.0 | 262.4 |
| 27.5 | 277.3 |
| 28.0 | 292.7 |
| 28.5 | 308.7 |
| 29.0 | 325.2 |
| 29.5 | 342.3 |
| 30.0 | 360.0 |

Optimal results are found where the blade of the helix goes through a complete rotation of 360° or 2π. However the rate of absorption will be decreased where the blade of the helix is rotated through less than 360°. A greater number of revolutions increases the power required to force the liquid through the mixer.

It is also found that a straight length of run-off pipe following the acceleration valve will increase the reaction time during which the dissolved gas may react with the liquid and any impurities dissolved in the liquid. Thus the length of straight run-off after the static aerator may be varied according to the reaction time required for the particular gas to react with the particular impurity.

Figure 2:
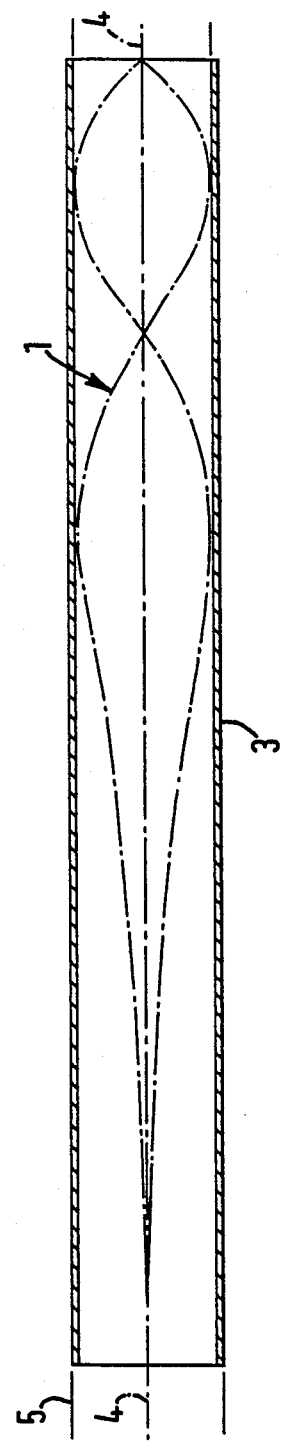
FIG. 2 is a cross-sectional view along lines II—II of FIG. 1 of the motionless mixer of the invention in place in a tube or pipe.

The operation of the motionless mixer of the present invention will be seen by reference to FIG. 2, wherein a pipe or tube is designated by numeral 3. The helical blade 1 is fixed along the diameter of the pipe, preferably so that the outside edge of the helical blade is in contact with the inside diameter of the tube. A liquid flows through the tube with a given velocity, and as it does so the liquid is split into two streams by blade 1 each of which is imparted with an angular momentum about the central axis of the tube 4. In a standard motionless mixer, this rotation is imparted over 180° only, and occurs at a constant rate. In the present invention, however, the rate at which the angular momentum is imparted to the streams of liquid increases over the length of the mixer, and over a full 360° rotation or more. Consequently if, a gas is injected under pressure into the liquid at point 5, for example, there will be a much greater pressure of contact between the gaseous bubbles and the liquid along the length of the mixer due to the increased centrifugal force acting on the liquid as against the sides of the pipe 3. As is well known, the greater the pressure applied to the liquid, the greater will be the rate of absorption of the gas. It has been found experimentally that the increased efficiency of the oxygen absorption rate is much greater than would be expected from a mere increase in the angular velocity of the fluid.

In its preferred form the static aerator is manufactured from a PVC (polyvinyl chloride) plastic, although a metal, ceramic or other suitable material may be used. In its use in waste water treatment, the static aerator is preferably 1¼" (3.17 cm) in diameter and approximately 30 cm in length.

For example, the helical blade or vane may be formed separately from plastic by heating a rectangular piece of plastic and rotating a portion of it to conform to the dimensions in Table 1. The rotated portion of the plastic is then allowed to cool, and the next adjoining portion of the piece of plastic is heated and twisted again to conform to the next adjoining parameters as set out in Table 1.

The present invention can be used in any application where a liquid is to be mixed with some other material, whether solid, liquid or gas. The motionless mixer of the invention is particularly well suited for the dissolution of gases in liquids in such applications as the oxygenation of liquids in pulp mills, the addition of nitrogen to wine in the wine industry, and the injection of carbon dioxide into water in the soft drink industry. Currently in the wine industry nitrogen is bubbled through the wine to improve the smoothness and palatability of the wine. The dissolution of the nitrogen in the wine may be rendered more effective using the static aerator of the present invention. Similarly, in the pulp and paper industry the raw liquid pulp is oxygenated to bleach the pulp. A bubbling process is currently used to carry out the oxygenation, but the static aerator of the present invention may be used to increase the effective rate of oxygenation. Similarly in the aqua-culture industry, improved oxygenation of the water improves the efficiency of the fish growth and the static aerator of the present invention may be used to further such oxygenation.

The invention has found a particularly useful application in waste water treatment systems, and in particular in a septic tank oxygenation system. In such systems, the rate at which bacteria process the waste materials in the water is determined to a large extent by the amount of oxygen available to the bacteria. By dissolving additional oxygen in the waste water, the activity of the bacteria is increased, and a smaller tile field will serve to process the same amount of waste water from a septic tank.

Figure 3:
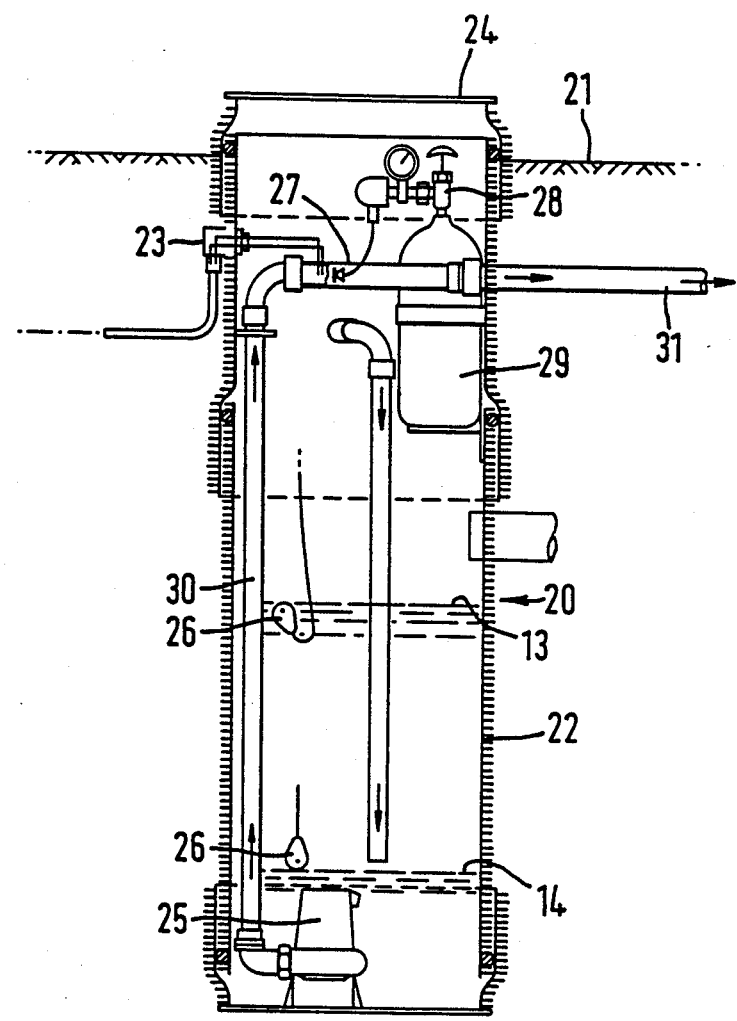
FIG. 3 is a diagram of a waste water treatment system utilizing the motionless mixer of the invention; and, FIG. 4 is a graph showing the progression of the helix angle of the helical mixing element along its length.

A septic tank oxygenator utilizing the static aerator of the present invention in association with a septic tank system is shown in FIG. 3. The oxygenator 20 is buried beneath the ground level 21. An inflow pipe 16 carries the waste water from a septic tank (not shown) which fills the oxygenator's watertight compartment 22. The unit has a lid 24, and a pump 25 connected to a switch 23 which is activated by a float 26. The unit contains a compressed oxygen cylinder 29 which has a pressure regulator 28. The static aerator of the invention is located in tube 27, so that the waste water from the pump flows through pipe 30, through the static aerator, and flows out into the tile field via pipe 31.

In operation, the watertight compartment will gradually fill with waste water, raising float 26 until the desired level 13 is reached, at which point switch 23 will be triggered to activate pump 25. The waste water is then pumped from the bottom of the unit through pipe 30 and through the static aerator at 27. At the same time, the float switch has activated solenoid valve 33 which permits the compressed oxygen to enter the flow of waste water just prior to the static aerator. The action of the acceleration valve serves to fully dissolve the compressed oxygen in the waste water as it exits into the tile field. Because of the high level of dissolved oxygen, bacteria in the tile field will quickly process the waste materials.

The amount of oxygen which is injected into the flow of waste water can be carefully controlled to minimize the loss of oxygen to the atmosphere through the regulation of the pressure in the oxygen stream and the regulation of the size of the orifice through which the oxygen flows into the stream of waste water. These two variables will depend on the volume of water displaced by the pump. Once the level of liquid in the unit has gone below the desired level 14, the floats will shut off pump 25 and solenoid valve 33.

EXAMPLE

Tests of the prototype static aerator were run under controlled conditions to determine the static aerator's performance in dissolving oxygen. A 45 gallon drum was filled with tap water at the usual pressure of the municipal water system of 45 psi and containing 6.1 parts per million dissolved oxygen. The water was pumped by a ⅓ horsepower submersible pump through a 1.25" (3.17 cm) PVC piping system consisting of two 90° elbows back into a five gallon pail. Oxygen was introduced by means of a solenoid valve prior to the first 90° elbow at 12 psi. Four tests were done. The average time to fill the pail was 7.5 seconds for five gallons, with a resulting dissolved oxygen content of 12 parts per million.

A test was then conducted with the same oxygen injector solenoid valve, but with the introduction of the static aerator. The oxygen was injected at the leading edge of the static aerator. The same ⅓ horsepower submersible pump was used and water temperature was the same. The test was run again four times and an average taken. To fill the five gallon bucket now took 14.7 seconds, but the oxygen level at the receiving end was higher than could be read by the dissolved oxygen meters used which had a maximum register of 20 parts per million.

A similar test was conducted on a city water supply having an oxygen content of 8.1 parts per million. The test utilized two different types of pump, a low head pump and a medium head pump. When the static aerator was used in conjunction with the injection of oxygen, a dissolved oxygen content averaging 35 parts per million resulted with the low head pump, and 29 parts per million with the medium head pump using again a ⅓ horsepower motor.

Water treatment systems of the type shown in FIG. 3 have been tested with favourable results. Where existing septic systems have been malfunctioning, replacement with the system shown has resulted in significant decrease in the BOD5 (biochemical oxygen demand for five days) level. The percolation of the soil has also been found to improve, resulting in the reduction of odor and leaching problems.

As will be apparent to persons skilled in the art, various modifications and adaptations of the structure above described are possible without departure from the spirit of the invention, the scope of which is defined in the appended claims.

The embodiments of the invention in which an exclusive property or privilege is claimed are defined as follows:

1. A static aerator for dissolving a gas in a liquid comprising a hollow tube and a helical mixing element secured to and extending along the longitudinal axis of said tube, wherein the pitch of said helical mixing element decreases continuously along the length of said element, and wherein the outer diameter of said helical element is approximately equal to, but less than, the inner diameter of said tube, and means to supply a gas-containing liquid to said tube.

2. The static aerator of claim 1 wherein the blade of said helical mixing element is twisted through at least approximately 180 degrees.

3. The static aerator of claim 2 wherein said blade is twisted through approximately 360 degrees.

4. The static aerator of claim 1 wherein the helical angle of said helical mixing element varies in proportion to the third power of the distance along the axis of the mixing element.

5. A method of dissolving a gas in a liquid comprising the steps of injecting said gas into the liquid and passing the liquid through a static aerator comprising a hollow tube and a helical mixing element secured to and extending along the longitudinal axis of said tube, wherein the pitch of said helical mixing element decreases continuously along the length of said element, and wherein the outer diameter of said helical element is approximately equal to, but less than, the inner diameter of said tube.

6. The method of claim 5 wherein said liquid is waste water and said gas is air or oxygen.

* * * * *